Patented Nov. 6, 1934

1,979,667

UNITED STATES PATENT OFFICE 1,979,667

DYESTUFFS OF THE DIAZINE SERIES

Wolfram Vogt and Eugen Huber, Leverkusen-I. G.-Werk, Germany, assignors to General Aniline Works, Inc., New York, N. Y., a corporation of Delaware No Drawing. Application March 23, 1933, Serial No. 662,389. In Germany April 1, 1932

8 Claims. (Cl. 260—29)

The present invention relates to new dyestuffs, more particularly it relates to dyestuffs of the azine series which are characterized by containing as substituent at least once a sulfoalkylene group which is attached to a nitrogen atom of the azine dyestuff.

Our new dyestuffs may be represented by the probable general formula:

wherein "A" stands for the radical of any azine dyestuff, "alk" stands for an alkylene group of at least two carbon atoms, such as ethylene, propylene, isopropylene, and wherein the sulfoalkylene group is attached to a nitrogen atom, for example, to a nitrogen atom of the diazine nucleus or to an aromatic amino group present in the molecule; in the said amino group the second hydrogen atom may be substituted, for example, by alkyl, such as methyl, ethyl, propyl, isopropyl; aralkyl, such as benzyl; aryl, such as phenyl; or substitution products thereof, such as hydroxyalkyl, sulfoalkyl, sulfoarylalkyl, chloroaryl and the like. Otherwise the azine radical "A" may have any constitution; thus, for example, the nuclei may bear further substituents, such as the sulfonic acid group; the carboxylic acid group; alkyl, such as methyl, ethyl, propyl, isopropyl; hydroxy-alkyl, such as hydroxyethyl; hydroxyl; alkoxy, such as methoxy or ethoxy; aryl, such as phenyl, chlorophenyl, sulfophenyl; halogen; the amino group; a substituted amino group, such as alkylamino, dialkylamino, hydroxyalkylamino, acylamino, —f. i. acetylamino-, benzoylamino-, and arylamino, —f. i. phenylamino- and sulfophenylamino-.

Our new dyestuffs are obtainable according to the known methods of preparing azine dyestuffs, for example, by oxidizing together the components in the usual manner, thereby using at least once an amine of the general formula:

aryl—N—alkylene—SO₃H
|
R wherein "R" stands for hydrogen or a suitable monovalent substituent, such as alkyl, hydroxyalkl, sulfoalkyl, aralkyl and aryl. Otherwise our new dyestuffs are obtainable by starting with an azine dyestuff containing at least once a replaceable hydrogen atom attached to a nitrogen atom and substituting the said hydrogen atom by a sulfoalkylene group, for example, by treating with a halogenalkyl sulfonic acid. All the methods of producing our new dyestuffs are more fully described in the examples. If desired, suitable substituents may be introduced subsequently into our new dyestuffs, for example, the sulfonic acid group by sulfonation in the usual manner.

Our new dyestuffs are in form of their alkali metal salts generally watersoluble dark powders, dyeing fibres clear red to greenish-blue shades of good fastness properties.

The invention is illustrated by the following examples, without being limited thereto:

*Example 1.*— 1.3-di(phenylamino)-naphthalene-8-sulfonic acid is oxidized together in an about 50% aqueous alcohol with 4-aminoethylphenyltaurine in the usual manner. The dyestuff having in the free state the following formula:

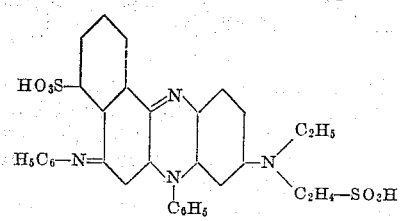

is in the form of its alkali metal salts a dark powder, soluble in water with a reddish-blue coloration, in concentrated sulfuric acid with a green coloration, dyeing wool reddish-blue shades of good fastness properties.

By substituting the 4-aminoethylphenyltaurine by 4-aminohydroxyethylphenyltaurine a dyestuff having in its free state the following formula:

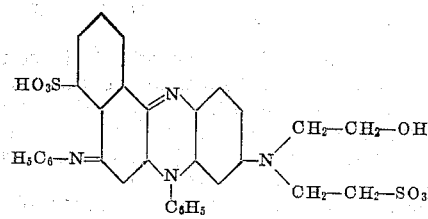

having similar properties is obtained.

By substituting the 1.3-di(phenylamino)-naphthalene-8-sulfonic acid by 1.3-di(m-tolylamino)- naphthalene-8-sulfonic acid or by 1.3-di(p-anisylamino)-naphthalene-8-sulfonic acid, dyestuffs having in their free states the following formulæ:

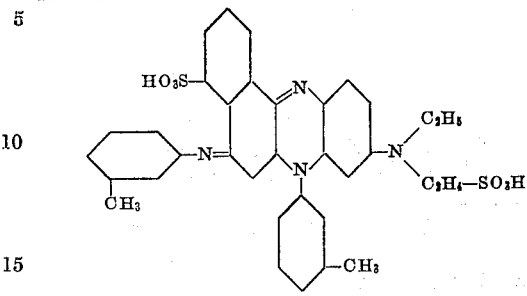

or

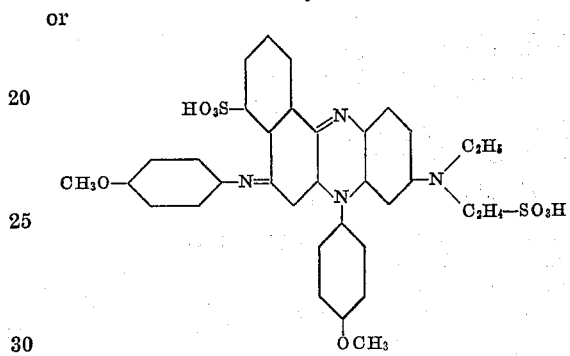

respectively, having similar properties are obtained.

*Example 2.*—1.3 - di(phenylamino) - naphthalene-8-sulfonic acid is oxidized together with 4 - aminobutylphenylaminopropane - β - sulfonic acid in an about 50% aqueous alcohol in the usual manner. The dyestuff having in the free state the following formula:

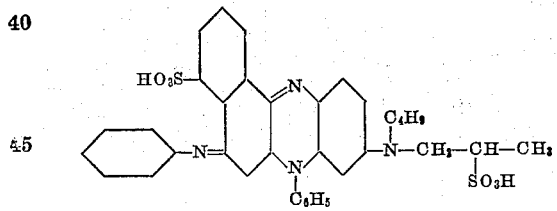

is soluble in concentrated sulfuric acid with a green coloration; it forms watersoluble alkali metal salts, yielding with water greenish-blue solutions and dyeing wool greenish-blue shades of good fastness properties.

*Example 3.*—Diphenyl-m-phenylenediamine is condensed in alcohol with 1.5 equimolecular proportions of p-nitroso-ethylphenyltaurine. The dyestuff thus obtained having in its free state the following formula:

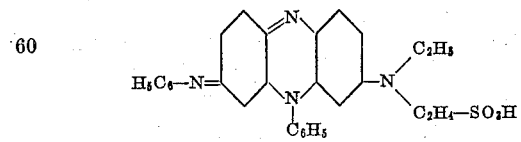

is difficultly soluble in water, soluble in concentrated sulfuric acid with a green coloration.

By after-treatment with a sulfonating agent it is rendered easily soluble in water, yielding bluish-violet solutions and dyeing wool bluish-violet shades of good fastness properties.

Instead of working with alcohol, other solvents, such as glacial acetic acid, can be used.

*Example 4.*—1.3-di-(phenylamino) - naphthalene-8-sulfonic acid is condensed in the usual manner with p-nitroso-di-β-sulfo-ethylaniline in pyridine. The dyestuff having in its free state the following formula:

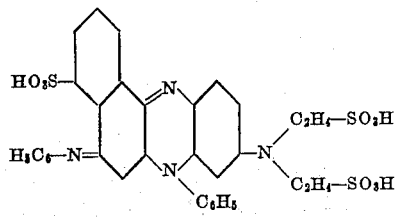

has properties similar to those of the dyestuff described in Example 1, paragraph 1.

*Example 5.*—Phenyl-β-naphthylamine is condensed in the usual manner in about 80% aqueous alcohol with p-nitrosoethylphenyltaurine to form the corresponding isorosinduline. The dyestuff having in the free state the following formula:

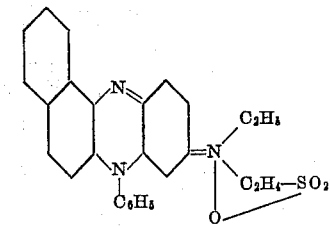

yields violet shades; it is valuable as intermediate product in the manufacture of naphthophenosafranines analogously to the process as described in Example 6. It is soluble in concentrated sulfuric acid with a brownish-violet coloration.

*Example 6.*—The dyestuff obtained in accordance with the Example 5 is transformed into the 6-sulfonic acid by the action of sodium bisulfite and the sulfonic acid in the 6-position is replaced by the radical of 4-aminoethylphenyltaurine by the action of the said amine in aqueous solution. The safranine thus obtained has in the free state the following formula:

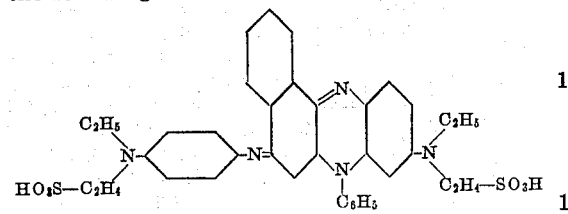

It is easily soluble in water with a blue coloration and dyes wool blue shades of good fastness to light and alkalies.

*Example 7.*—β-naphthyltaurine is oxidized together with 4 - aminodiethylaniline-3-sulfonic acid in aqueous weakly acetic acid solution, the isorosinduline thus obtained is transformed into the corresponding 6-sulfonic acid by the action of sodium bisulfite and the 6-sulfonic acid is transformed into the eurhodine with 5-amino-2-ethyltoluidine. The dyestuff thus obtained has in its free state the following formula:

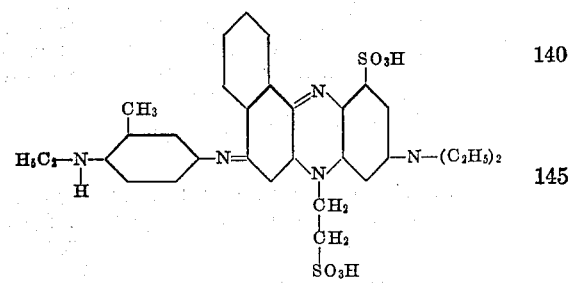

It is soluble in water with a greenish-blue coloration, in concentrated sulfuric acid with a green coloration and dyes wool blue shades.

By treating the dyestuff with a sulfonating agent the affinity to the fibre is increased.

By substituting the 4-amino-diethylaniline-3-sulfonic acid by 4-amino-ethylbenzylaniline-2-sulfonic acid and otherwise working according to the directions given above, a dyestuff having in the free state the following formula:

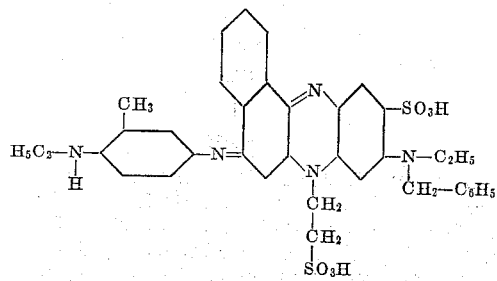

having similar properties is obtained.

Example 8.—4'-nitro-4-aminodiphenylamine-2'-sulfonic acid is oxidized in aqueous solution with ethylphenyltaurine to form the corresponding indamine, and the latter is transformed into a safranine by joint oxidation with p-sulfanilic acid. If desired, the nitro group can be reduced in the usual manner subsequently. The reduced dyestuff has in the free state the following formula:

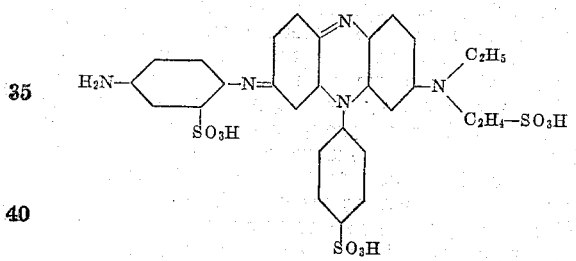

It is easily soluble in water with a bluish-violet coloration and dyes wool clear blue shades.

By after-treatment with an acetylating agent the dyestuff is acetylated in the amino group, yielding a product having similar properties.

By substituting the p-sulfanilic acid by the p-amino-salicylic acid a dyestuff having similar properties is obtained.

Example 9.—4-amino-methylphenyltaurine, o-toluidine and aniline are oxidized together in aqueous solution to form the corresponding safranine. The dyestuff thus obtained has in the free state the following formula:

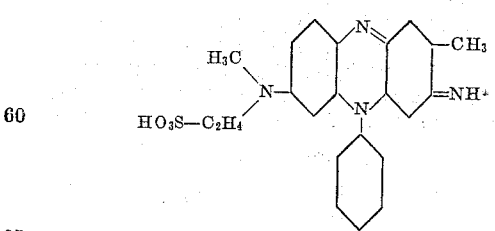

It is soluble in water with a clear bluish-red, in concentrated sulfuric acid with a green coloration and dyes tanned cotton very clear bluish-red shades; on wool similar shades are obtained.

Example 10.—Methylphenyltaurine, 2.5-toluylenediamine and o-toluidine are oxidized together in the usual manner in aqueous solution to form the corresponding safranine. The dyestuff obtained has properties similar to those of the dyestuff described in Example 9.

Example 11.—Safranine FF extra (compare Colour Index 1924, No. 841) is refluxed in alcoholic solution with chloroethane-sulfonic acid in the presence of diethylaniline as acid-binding agent. The dyestuff thus obtained has in the free state the following formula:

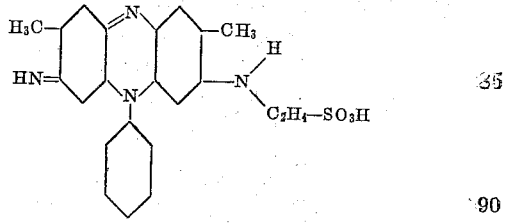

is somewhat more bluish than the starting dyestuff. Otherwise it has properties similar to those of the dyestuffs described in Examples 9 and 10.

Example 12.—The isorosinduline-sulfonic acid of the formula:

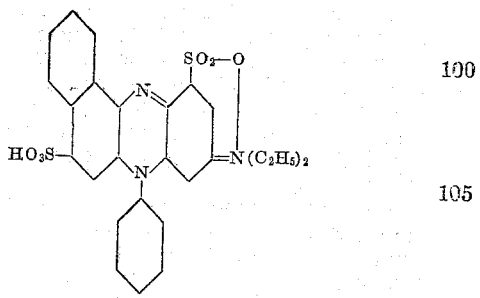

is refluxed for a short time in neutral aqueous solution with p-amino-β-sulfethylbenzylaniline. Thus is obtained the safranine corresponding in the free state to the following formula:

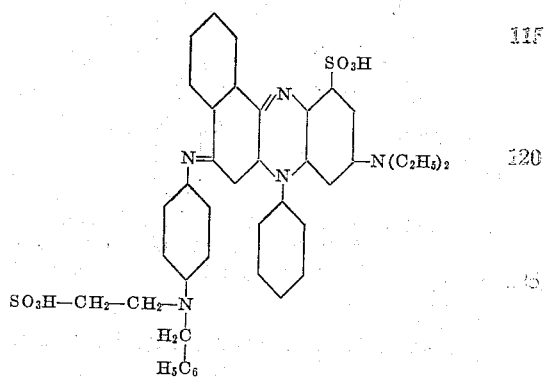

It yields somewhat more greenish shades than the dyestuff described in Example 6 and has otherwise similar properties.

In an analogous manner there is prepared a safranine of the following formula:

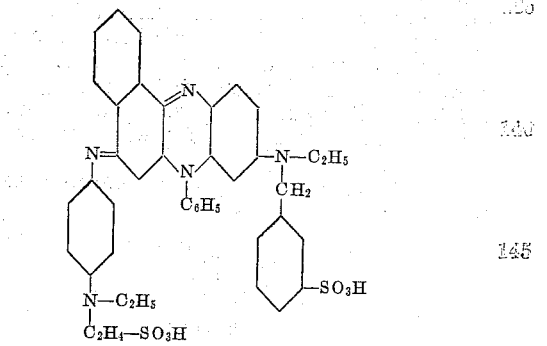

having similar properties.

*Example 13.*—3-diethylisorosinduline - 1.6 - disulfonic acid are heated in neutral to weakly alkaline aqueous solution with 4-aminophenylbutyl-aminopropane-sulfonic acid, until a test portion is soluble in concentrated sulfuric acid with clear greenish coloration. The dyestuff having in its free state the following formula:

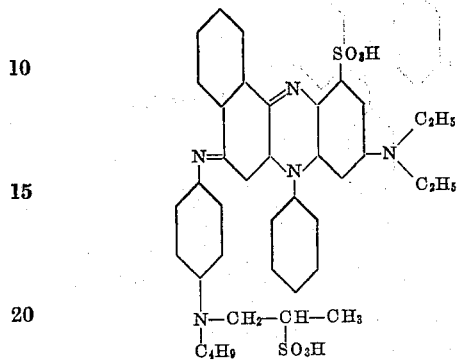

is isolated by salting out with common salt; it is soluble in concentrated sulfuric acid with a green, in water with a blue coloration and dyes wool even blue shades of good fastness properties.

*Example 14.*—Chlorotolyl - β - naphthylamine and 4-aminodiethylaniline-3-sulfonic acid are oxidized to the corresponding isorosinduline in the usual manner. The dyestuff is transformed into the corresponding 6-sulfonic acid by the action of sodium bisulfite and the 6-sulfonic acid is replaced by the radical of 4-aminophenylbenzyl-taurine. The safranine thus obtained has in the free state the following formula:

It is soluble in water with a blue, in concentrated sulfuric acid with a green coloration and dyes wool blue shades of good fastness to light and washing.

We claim:

1. Azine dyestuffs of the general formula:

wherein one R stands for a radical of the benzene series, the other R stands for a radical of the benzene or naphthalene series, alk stands for an alkylene group containing at least two carbon atoms, and wherein the sulfoalkylene group is attached to a nitrogen atom, forming watersoluble alkali metal salts, dyeing fibres generally clear red to greenish-blue shades of good fastness properties.

2. Azine dyestuffs of the general formula:

wherein one R stands for a radical of the benzene series, the other R stands for a radical of the benzene or naphthalene series, "alk" stands for an alkylene group containing at least two carbon atoms, forming watersoluble alkali metal salts, dyeing fibres generally clear red to greenish-blue shades of good fastness properties.

3. Azine dyestuffs of the general formula:

wherein one R stands for a radical of the benzene series, the other R stands for a radical of the benzene or naphthalene series, forming watersoluble alkali metal salts, dyeing fibres generally clear red to greenish-blue shades of good fastness properties.

4. Azine dyestuffs of the general formula:

wherein one R stands for a radical of the benzene series, the other R stands for a radical of the benzene or naphthalene series, "$x$" stands for hydrogen, alkyl or a radical of the benzene series, "$y$" stands for hydrogen, alkyl, or benzyl, which radicals may be substituted by hydroxyl or a sulfonic acid group, "alk" stands for an alkylene group containing at least two carbon atoms, and "$n$" stands for one of the numbers one and two, forming watersoluble alkali metal salts, dyeing fibres generally clear red to greenish-blue shades of good fastness properties.

5. Azine dyestuffs of the general formula:

wherein one R stands for a radical of the benzene series, the other R stands for a radical of the benzene or naphthalene series, "$x$" stands for hydrogen, alkyl or a radical of the benzene series, "$y$" stands for hydrogen, alkyl, or benzyl, which radicals may be substituted by hydroxyl or a sulfonic acid group, and "$n$" stands for one of the numbers one and two, forming watersoluble alkali metal salts, dyeing fibres generally clear red to greenish-blue shades of good fastness properties.

6. The azine dyestuff of the following formula:

dyeing wool blue shades of good fastness properties.

7. The azine dyestuff of the following formula:
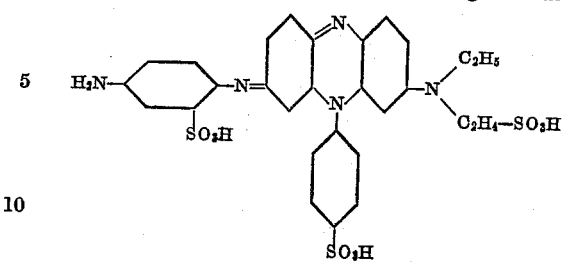
dyeing wool clear blue shades of good fastness properties.
8. The azine dyestuff of the following formula:
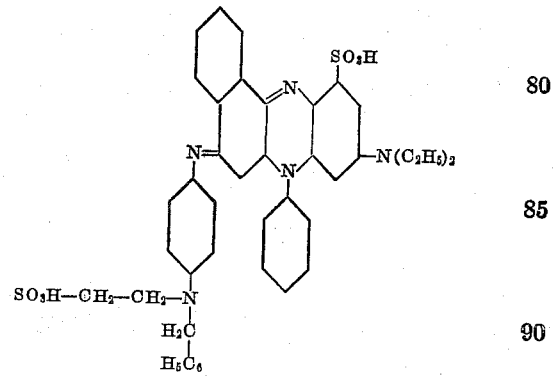
dyeing wool greenish-blue shades of good fastness properties.
WOLFRAM VOGT.
EUGEN HUBER.